US011070609B1

(12) United States Patent
Kumar

(10) Patent No.: US 11,070,609 B1
(45) Date of Patent: Jul. 20, 2021

(54) SYSTEM AND METHOD FOR DOWNLOADING A FILE

(71) Applicant: Veritas Technologies LLC, Mountain View, CA (US)

(72) Inventor: Rajesh D. Kumar, Mountain View, CA (US)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 451 days.

(21) Appl. No.: 14/133,432

(22) Filed: Dec. 18, 2013

(51) Int. Cl.
*H04L 29/08* (2006.01)

(52) U.S. Cl.
CPC .................................. *H04L 67/06* (2013.01)

(58) Field of Classification Search
CPC .. G06F 3/0608; G06F 3/0641; G06F 11/1453; G06F 17/3015; G06F 17/30011; G06F 17/30159; G06F 17/30876; G06F 17/30899; G06F 21/10; G06F 3/067; G06F 17/30174; G06Q 30/02; H04L 29/08117; H04L 67/02; H04L 67/06; H04L 67/32; H04L 67/34; H04L 67/104; H04L 67/1085; H04L 63/10; H04L 67/28; H04L 67/306; H04L 67/325; H04L 67/2819; H04L 67/10
See application file for complete search history.

(56) References Cited

U.S. PATENT DOCUMENTS

| | | | | |
|---|---|---|---|---|
| 6,401,239 B1* | 6/2002 | Miron | ....................... | G06F 8/68 707/661 |
| 8,028,039 B1* | 9/2011 | Hawkins | ........... | G06F 17/30174 709/217 |
| 8,959,209 B1* | 2/2015 | Kumar | .............. | G06F 17/30899 707/723 |
| 2003/0212756 A1* | 11/2003 | Kuroda | ................... | H04L 67/06 709/217 |
| 2004/0199809 A1* | 10/2004 | Hanam | ............... | G06F 11/1004 714/4.1 |
| 2007/0201502 A1* | 8/2007 | Abramson | .............. | H04L 67/32 370/429 |
| 2007/0289021 A1* | 12/2007 | Xavier | .................... | G06F 21/10 726/26 |
| 2008/0147876 A1* | 6/2008 | Campbell | ......... | G06F 17/30011 709/232 |
| 2008/0162666 A1* | 7/2008 | Ebihara | ................... | H04L 67/06 709/217 |
| 2008/0163191 A1* | 7/2008 | Kania | ..................... | H04L 67/06 717/173 |
| 2009/0327079 A1* | 12/2009 | Parker | .................... | G06Q 30/02 705/14.55 |
| 2010/0094817 A1* | 4/2010 | Ben-Shaul | ............ | G06F 3/0608 707/697 |

(Continued)

*Primary Examiner* — Nicholas R Taylor
*Assistant Examiner* — Michael Li
(74) *Attorney, Agent, or Firm* — Patent Law Works LLP

(57) ABSTRACT

A method and system that performs file download at a client computing device after a determination that the file does not already exist on the client computing device is provided. The file download is initiated but suspended until a determination has been made that the file does not exist on the client computing device. If the file already exists (i.e., the file is a duplicate file), the user is prompted to either cancel the file download or continue the file download. However, if the file does not exist, the file download is resumed.

9 Claims, 5 Drawing Sheets

(56) References Cited

U.S. PATENT DOCUMENTS

2012/0084399 A1* 4/2012 Scharber ................ H04L 67/34
　　　　　　　　　　　　　　　　　　　　709/219
2014/0149556 A1* 5/2014 Pang ....................... H04L 67/10
　　　　　　　　　　　　　　　　　　　　709/219

* cited by examiner

SYSTEM AND METHOD FOR DOWNLOADING A FILE

BACKGROUND

Generally, users may download the same file onto their system multiple times due to the user and the system lacking knowledge of files that are already available on the system. Repeated downloads of the same file leads to unnecessary consumption of disk space and the user's network bandwidth. Duplicate file detectors identify duplicate files in the user's system. However, for duplicate file detectors to identify the duplicate files, the files have to be completely downloaded onto the system, i.e., the download has to be fully completed, which does not address the burdens with regard to consumption of disk space and network bandwidth. Currently, no system exists that identifies duplicate files before a file gets downloaded onto the system.

It is within this context that the embodiments arise.

SUMMARY

In some embodiments, a method for determining whether a hash for file whose download has been initiated exists is provided. The method includes receiving, from a client computing device, an URL (uniform resource locator) associated with a file whose download has been initiated and temporarily suspended at the client computing device. The method includes determining whether a hash of the file exists in a database, wherein the database comprises file information associated with a plurality of files. The method includes in response to a determination that the hash of the file does not exist in the database, communicating an indication to the client computing device that the hash of the file does not exist, wherein the download of the file is resumed at the client computing device in response to the indication that the hash of the file does not exist.

In some embodiments, a system is provided. The system includes a link hash server coupled to a database, the database configured to store file information associated with a plurality of files. The link hash server includes a processor that is configured to: receive, from a client computing device, an URL (uniform resource locator) associated with a file whose download has been initiated and temporarily suspended at the client computing device; determine whether a hash of the file exists in a database, wherein the database comprises file information associated with a plurality of files; and in response to a determination that the hash of the file does not exist in the database, communicate an indication to the client computing device that the hash of the file does not exist, wherein the download of the file is resumed at the client computing device in response to the indication that the hash of the file does not exist.

In some embodiments, a method for determining whether to download a file is provided. The method includes receiving, from a link hash server, an indication regarding whether a hash for a file whose download is initiated and temporarily suspended at a client computing device exists in a database. The method includes in response to an indication that a hash exists for the file, receiving the hash from the link hash server, comparing the hash with a set of hashes for a plurality of files that are local to the client computing device, determining whether the file already exists at the client computing device based on the comparison, and resuming download of the file at the client computing device in response to a determination that the file does not exist at the client computing device.

In some embodiments, a computing device is provided. The computing device includes a processor that is configured to receive, from a link hash server, an indication regarding whether a hash for a file whose download is initiated and temporarily suspended at the computing device exists in a database. In response to an indication that a hash exists for the file, the processor is configured to: receive the hash from the link hash server; compare the hash with a set of hashes for a plurality of files that are local to the computing device; determine whether the file already exists at the computing device based on the comparison; and resume download of the file at the computing device in response to a determination that the file does not exist at the computing device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A system and related method is described that performs file downloads at a client computing device after a determination that the file does not already exist on the client computing device. In some embodiments, the file download is initiated but suspended until a determination has been made that the file does not exist on the client computing device. In some embodiments, if the file already exists (i.e., the file is a duplicate file), the file download may be cancelled. However, if the file does not exist on the client computing device, i.e., the file has not been previously downloaded, the file download is resumed. According to various implementations of the embodiments, a file may include a web page, a document, a data file, a text file, a program file, an audio file, an image, video, or other data formats and file types. It should be appreciated that while the embodiments refer to calculating or determining a hash value associated with an URL, this is not meant to be limiting as the use of a hash function is one example. That is, other functions besides hash functions that generate a unique identifier for each different URL may be utilized with the embodiments described herein.

Figure 1:
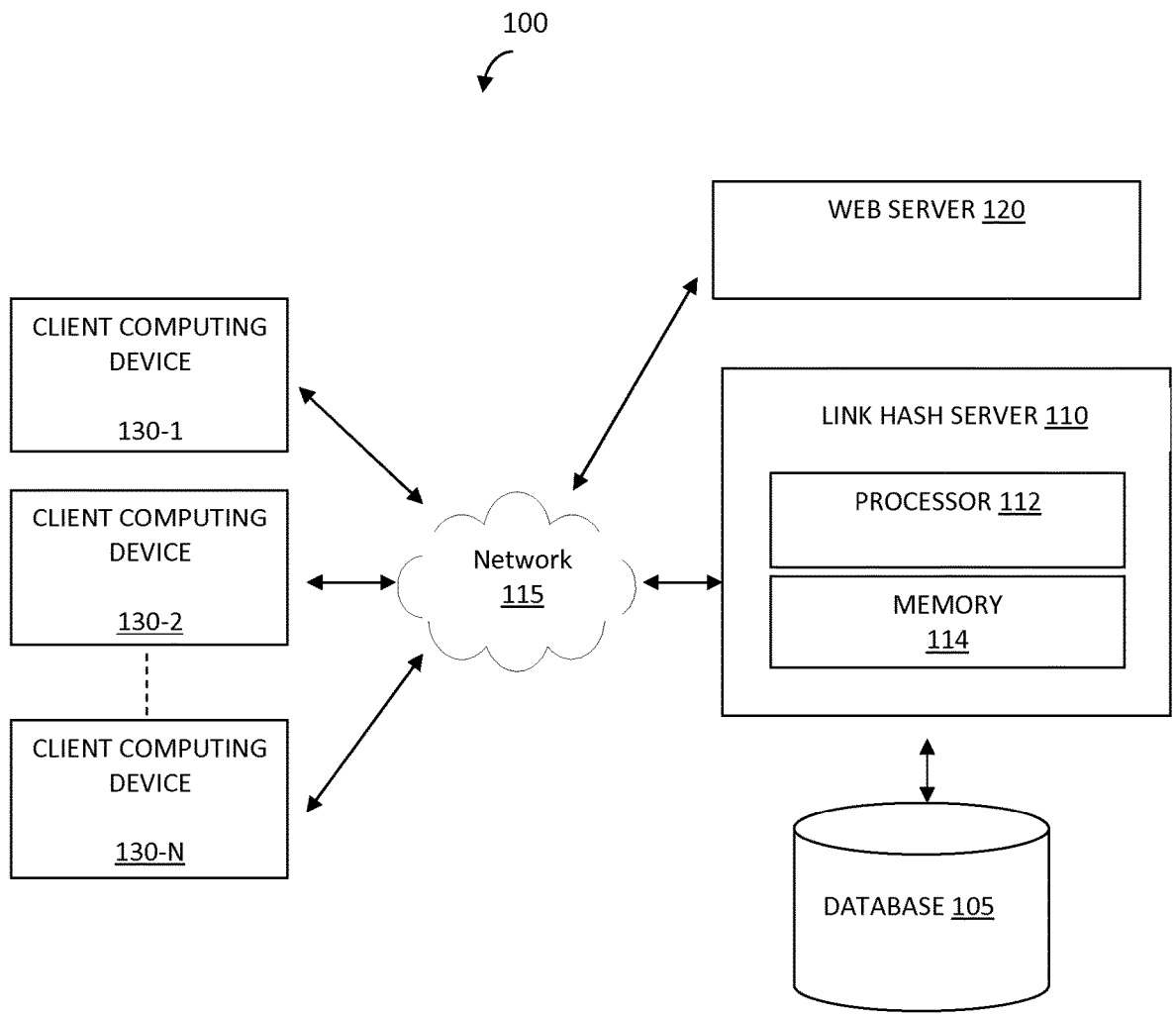
FIG. 1 is a schematic diagram of a system including a link hash server, according to various embodiments.

FIG. 1 shows a system 100 including link hash server 110 that performs a determination of whether a hash of a file (whose download has been initiated but not completed) exists in database 105. Download of the file may be initiated at one or more client computing devices 130-1, 130-2, . . . , 130-N (referred to herein as client computing device(s) 130). Web server 120 may host a website via which the file download is initiated. Link hash server 110 may be communicably coupled to the web server 120 and client computing device(s) 130 via network 115. Network 115 may include any one or more of, for instance, the Internet, an intranet, a LAN (local area network), a WAN (Wide area network), a storage area network, a MAN (metropolitan area network), a wireless communication network, or other network or combination of networks. In some implementations, link hash server 110 may be coupled to database 105 via another network (not otherwise illustrated in FIG. 1), which may include a storage area network or network attached storage. The above-described networks could be combined, or further networks could be used, etc. Other arrangements and networks for the link hash server 110, the client computing device(s) 130, web server 120 and database 105 are readily devised.

Link hash server 110 may include a plurality of distributed servers that are capable of accessing, analyzing, and maintaining (in conjunction with the database 105) links/URLs associated with web content across the Internet, files associated with the links, hashes associated with the files, and/or other performing other operations. Database 105 may store file information associated with a plurality of files available globally over the Internet. For example, database 105 may store for each file, a file ID, URL, hash of the file, and/or other information. According to various implementations of the invention, examples of database 105, include, for instance, a relational database, a filesystem, and/or other device or data representation configured for data storage. In some implementations, the file information may include reputation information for the file as well. Link hash server 110 may determine reputation information associated with the plurality of files and store the reputation information (along with file ID, URL, hash, and/or information) in the database 105.

Link hash server 110 may include a processor 112, memory 114, and/or other components that facilitate the functions of link hash server 110. In some implementations, processor 112 includes one or more processors/hardware processors configured to perform various functions of link hash server 110. In some implementations, memory 114 includes one or more tangible (i.e., non-transitory) computer readable media. Memory 114 may include one or more instructions that when executed by processor 112 may configure processor 112 to perform functions of link hash server 110. In some implementations, memory 114 may include one or more instructions stored on tangible computer readable media that when executed at a remote device (such as, client computing device(s) 130) may cause the remote device to perform various functions of the remote device described herein and to facilitate interaction with link hash server 110, as described herein.

Client computing device(s) 130 may each include a processor, a memory, a monitoring component (not otherwise illustrated in FIG. 1) and/or other components that facilitate the functions of the client computing device(s) 130. In some implementations, the device processor includes one or more processors/hardware processors configured to perform various functions of client computing device 130. In some implementations, the device memory includes one or more tangible (i.e., non-transitory) computer readable media. The device memory may include one or more instructions that when executed by the device processor may configure the device processor to perform functions of the client computing device 130.

Client computing/processing device(s) 130 may include, for instance, a personal computer, portable computer, personal digital assistant (PDA), workstation, web-enabled mobile telephone, a smart phone, a tablet computing device, a WAP device, web-to-voice device, or other device. Those having skill in the art will appreciate that the invention described herein may work with various system configurations.

The monitoring component of the client computing device 130 may monitor file system changes (for example, file downloads, file deletion, file modification, etc.) occurring at the client computing device 130. The monitoring component determines/calculates a hash of every file stored at the client computing device 130. In some implementations, the monitoring component may determine the file(s) whose hash needs to be calculated (in the case of a new file download, for example) or recalculated (in the case of a change to the content of a file, for example) based on the detection of a file system change. The monitoring component stores the hashes for all the local files (i.e., files that are local to the client computing device) in the device memory. The monitoring component may determine the hash using a hashing algorithm, such as MD5 (message digest algorithm), SHA (secure hash algorithm), or any other hashing algorithm.

A user of client computing device 130 may access a website hosted by web server 120 via a web browser (not otherwise illustrated in FIG. 1) running on the client computing device 130. The user may request a file (i.e., file download) by inputting, into the web browser, an URL (universal resource locator) that identifies the file. In some embodiments, the web browser may include a browser plug-in that is configured to detect/identify the initiation of a download of a file from the URL. The file download may be initiated by the user (i.e., user may be prompted to initiate the file download) or may be automatically initiated upon URL access (i.e., the file download may automatically start when the webpage associated with the URL is opened by the web browser). It should be appreciated that the browser plug-in may temporarily suspend the file download after initiation of the file download or access of the URL. In some embodiments, the browser plug-in may determine the URL from which the file download is initiated. The browser plug-in may request, from the link hash server 110, a hash for the file whose download is initiated. In some implementations, the URL is communicated to link hash server 110 (i.e., a request including the URL is generated and communicated to the link hash server 110).

Link hash server 110 may receive the URL associated with the file whose download has been initiated and temporarily suspended at the client computing device 130. Link hash server 110 may search database 105 to determine whether a hash for the file exists in the database. In some implementations, link hash server 110 may query the database 105 that stores file information associated a plurality of files available globally over the Internet. Link hash server 110 may query the database 105 based on the received URL. The lookup may be a structured query language (SQL) query, lightweight directory access protocol (LDAP) query, and/or any other known methods of querying the database.

In response to a determination that a hash exists, link hash server 110 may communicate the hash to the client computing device 130 that requested the hash. In some implementations, link hash server 110 provides an indication (in the form of a message or other indication) to the client computing device 130 that a hash exists for the file and may communicate the hash to the client computing device 130.

In response to a determination that a hash for the file does not exist in database 105, link hash server 110 may provide an indication (in the form of a message or other indication) to the client computing device 130 that a hash does not exist for the file. In some embodiments, link hash server 110 downloads the file from the URL and calculates the hash for the file. Link hash server 110 may communicate the file, the URL and calculated hash to database 105 for storage. An entry for the file may be created (in a table, for example) and database 105 may store the file ID, the URL, the hash, and/or other information associated with the file.

An example of a case when a hash for a file may not exist in the database 105 would be when a URL associated with a particular file (whose download has been initiated and temporarily suspended) is received by the link hash server 110 for the first time (i.e., the download for the file associated with the URL has not been requested before). In this case, database 105 may not include file information associated with the particular file. Link hash server 110 may access the URL, download the particular file to the link hash server 110 (at the backend in some embodiments), calculate the hash of the file, and may store file information (file ID, URL, hash, etc.) associated with the particular file in the database 105. In this manner, the database 105 is populated with file information associated with a plurality of files based on file download requests provided by the client over time. Database 105 may include a repository of file information that is gathered from the Internet over time.

When the URL associated with the particular file is received by the link hash server 110 subsequently after the first time (from the same client computing device (i.e., same user) or a different client computing device (i.e., different user)), link hash server 110 may make a determination that a hash for the particular file exists in the database 105 based on querying the database.

In some embodiments, the link hash server 110 obtains the URL list from the clients to find the file associated with the URL and computes the hash of the file after downloading the file in case no entry for the URL exists, e.g., during initiation of download from the client. It should be appreciated that in alternative embodiments the URL list with the assistance of web crawler software that can fetch and give all the URLs available all over the Internet to the link hash server 110 and make entries in database 105 of each URL of the fetched URL list. Thus, in these embodiments, a file downloaded from different URLs will be detected as being previously downloaded.

In some implementations, in response to a determination that a hash for the file does not exist in database 105, link hash server 110 may add the URL associated with the file to a list of pending URLs maintained by the link hash server 110. The list of pending URLs may include one or more URLs for which link hash server 110 does not have associated file information and has to download and calculate the hash of the file. In some implementations, link hash server 110 may provide an indication to the client computing device 130 that hash does not exist in the database 105 and may add the URL to the list of pending URLs. At a later time, link hash server 110 may access the URLs in the list of pending URLs, may download the files from the URLs, may calculate the hashes for the files and may cause the file information associated with the files to be stored in the database 105.

In order to keep the information in database 105 accurate and updated (i.e., file information in the database 105 updated), link hash server 110 may perform file download and/or hash calculation periodically or at regular scheduled intervals. If any URLs and/or files (for which file information is maintained in the database 105) are updated/changed, the associated file information in the database needs to be updated as well. In some implementations, link hash server 110 may track the frequency at which URLs and/or files change. For example, a first URL may be updated daily (at a high frequency) and second URL may be updated monthly (at a low frequency). Link hash server 110 may assign priorities to the URLs and/or files based on the frequency at which they are updated. For example, the first URL may be assigned a higher priority than the second URL because the first URL is updated at a higher frequency than the second URL. Thus, link hash server 110 may update the file information associated with higher priority URLs prior to and/or at a higher frequency than the file information associated with lower priority URLs.

In some implementations, link hash server 110 may subscribe to a website wherein whenever any change to website content (such as URLs and/or files) occurs at the website, a notification is communicated to the link hash server 110 indicating that a change has occurred. A list of updated URLs and/or files may be communicated to the link hash server 110. File download and/or hash calculation may be performed by the link hash server 110 based on the list. In other words, link hash server 110 may update the file information in the database based on the list (i.e., database 105/file information in the database 105 may be updated based on the list of updated URLs and/or files communicated to the link hash server).

In some implementations, link hash server 110 may communicate, to the client computing device 130 that requested the hash, an indication (in the form of a message or other indication) regarding whether a hash of the file exists. The browser plug-in at client computing device 130 may receive an indication that the hash does not exist at the link hash server 110/database 105. In response to the indication that the hash does not exist, the browser plug-in may resume the download of the file (that was previously temporarily suspended). In response to the indication that the hash exists, the browser plug-in may retrieve the hash communicated to the client computing device 130 by link hash server 110 (i.e., received from the link hash server 110). The browser plug-in may compare the received hash with a set of hashes for the local files (i.e., hashes of local files determined by the monitoring component of client computing device 110). In response to no match, a determination may be made that the file (whose download has been initiated and temporarily suspended) does not exist on the client computing device 130. In this case, the file download may be resumed as the file is not a duplicate file.

In response to a match, a determination may be made that the file (whose download has been initiated and temporarily suspended) already exists on the client computing device 130 (i.e., the file is a duplicate file). In this embodiment, a notification (via the web browser) may be provided to the user that the file already exists on the client computing device 130. In some implementations, the location of the file may be presented to the user. The user may be provided an option to (i.e., prompted to) either cancel or continue the file download.

In this manner, any file duplicates are identified before they are downloaded onto the client computing device 130 thereby saving disk space and network bandwidth of the user. In other words, a file download is performed at the client computing device 130 only after a determination that the file does not already exist on the client computing device 130 and this determination is performed in conjunction with the link hash server 110.

Figure 2:
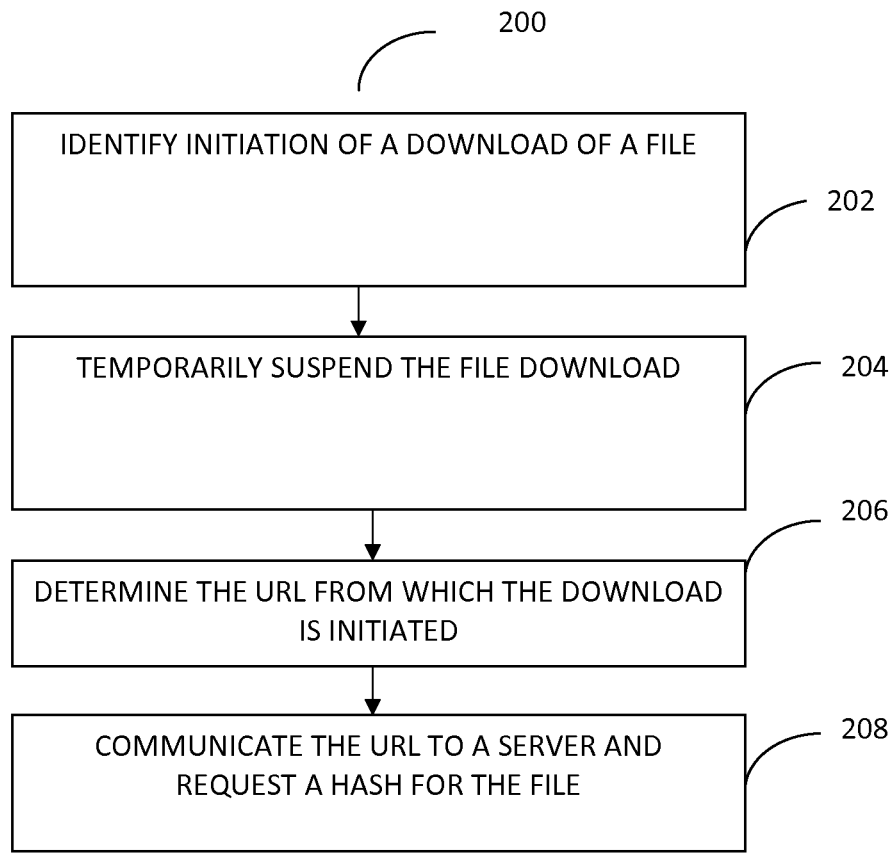
FIG. 2 is a flow diagram of a method of requesting a hash for a file, which can be practiced on the client computing device of FIG. 1, according to various embodiments.

FIG. 2 illustrates a flowchart of one embodiment of a method 200 of requesting a hash for a file whose download has been initiated at the client computing device (by the browser plug-in, for example). The method may include example operations performed by a specially programmed processor or computing device, and can be practiced on the client computing device 130 of FIG. 1 in some embodiments. In some implementations, the described operations may be accomplished using one or more of the modules/components described herein. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting. It should be appreciated that the method can be practiced in a single pass, or in a loop.

In an operation 202, initiation of a download of a file from a URL may be identified. In an operation 204, the file download may be temporarily suspended. In an operation 206, the URL from which the file download is initiated is determined. In an operation 208, a hash for the file is requested from the link hash server. In some implementations, the URL is communicated to link hash server (i.e., a request including the URL is generated and communicated to the link hash server).

Figure 3:
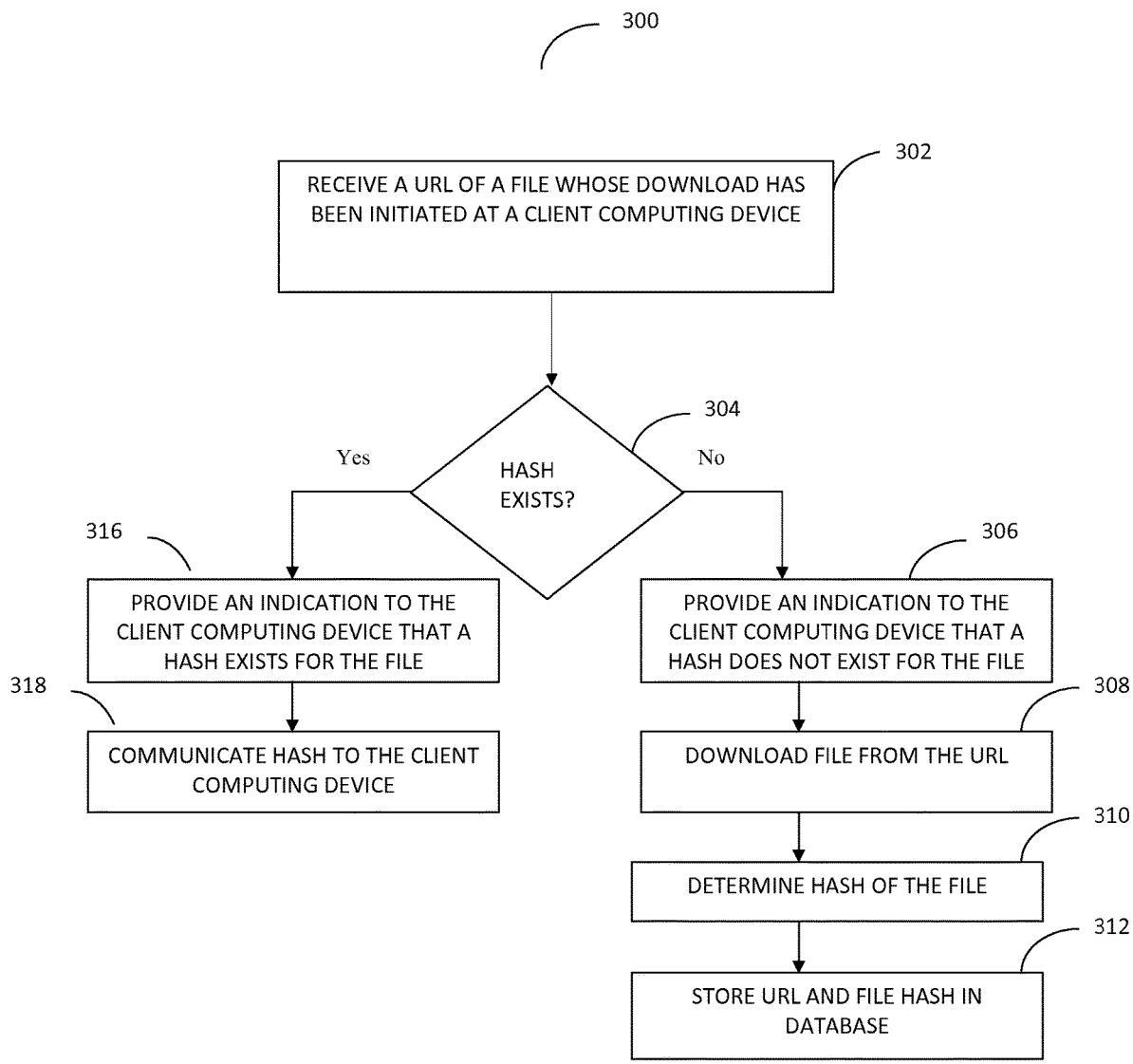
FIG. 3 is a flow diagram of a method of determining whether a hash for a file exists, which can be practiced on the link hash server of FIG. 1, according to various embodiments.

FIG. 3 illustrates a flowchart of one embodiment of a method 300 of determining whether a hash for file whose download has been initiated exists at the link hash server/database. The method may include example operations performed by a specially programmed processor or computing device, and can be practiced on the link hash server 110 of FIG. 1 in some embodiments. In some implementations, the described operations may be accomplished using one or more of the modules/components described herein. In some implementations, various operations may be performed in different sequences. In other implementations, additional operations may be performed along with some or all of the operations shown in FIG. 3. In yet other implementations, one or more operations may be performed simultaneously. In yet other implementations, one or more operations may not be performed. Accordingly, the operations described are exemplary in nature and, as such, should not be viewed as limiting. It should be appreciated that the method can be practiced in a single pass, or in a loop.

In an operation 302, an URL of a file whose download has been initiated and temporarily suspended at a client computing device is received. In an operation 304, a determination is made regarding whether a hash of the file exists in a database or other storage entity capable of storing hash files. It should be appreciated that a comparison operation of the hash of the file and the stored hashes may be utilized to achieve this operation. In response to a determination that a hash exists in database, an indication is provided to the client computing device that the hash exists for the file, in an operation 316. The hash is communicated to the client computing device in operation 318 so that the client device may access the file without the need to download the file.

In response to a determination that a hash does not exist in database, an indication is provided to the client computing device that the hash does not exist for the file, in an operation 306. In some implementations, the file may be downloaded from the URL, in an operation 308. The hash of the file may be determined, in an operation 310. The URL, file hash, and/or other file information is stored in the database, in an operation 312.

Figure 4:
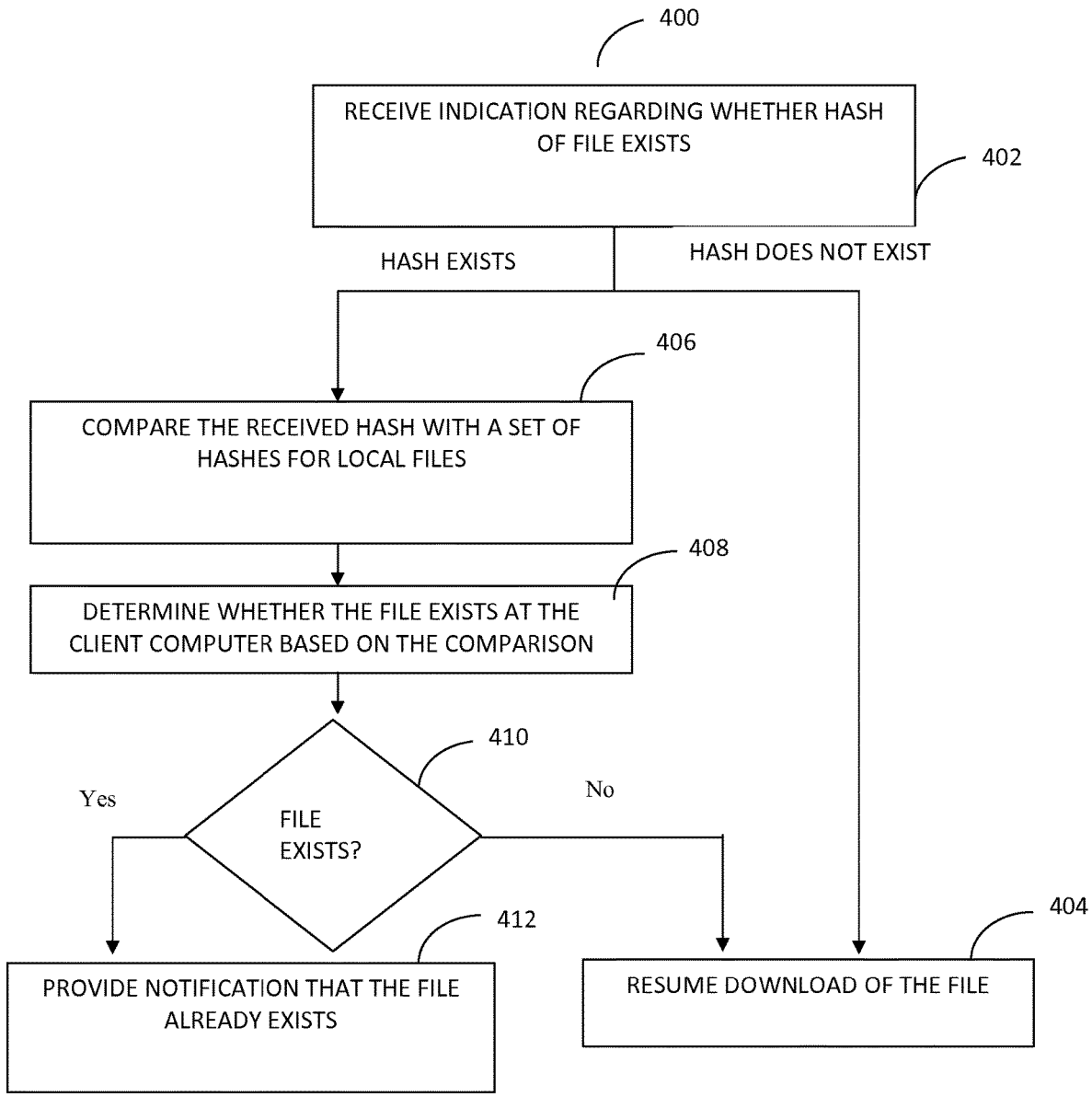
FIG. 4 is a flow diagram of a method of determining whether a file is to be downloaded, which can be practiced on the client computing device of FIG. 1, according to various embodiments.

FIG. 4 illustrates a flowchart of one embodiment of a method 400 of determining whether a file is to be downloaded at the client computing device 130 (by the browser plug-in, for example). The method may include example operations performed by a specially programmed processor or computing device, and can be practiced on the client computing device 130 of FIG. 1 in some embodiments. In some implementations, the described operations may be accomplished using one or more of the modules/components described herein. In some implementations, various operations may be performed in different sequences. In other implementations, additional operations may be performed along with some or all of the operations shown in FIG. 4. In yet other implementations, one or more operations may be performed simultaneously. In yet other implementations, one or more operations may not be performed. Accordingly, the operations described are exemplary in nature and, as such, should not be viewed as limiting. It should be appreciated that the method can be practiced in a single pass, or in a loop.

In an operation 402, an indication regarding whether a hash for the file (whose download has been initiated and temporarily suspended) exists at link hash server/database. This indication may be received in response to the request to the link hash server for a hash for the file. In response to an indication that a hash for the file does not exist at database (i.e., the download for the file has not been requested before), the download of the file is resumed, in an operation 404.

In response to an indication that a hash for the file exists at database, the hash may be received from the link hash server. The received hash may be compared with a set of hashes for the local files on the client computing device, in an operation 406. In an operation 408, a determination may be made regarding whether the file (whose download has been initiated and temporarily suspended) already exists at the client computing device based on the comparison. In response to a determination that the file already exists (i.e., it is a duplicate file), a notification (in the form of an alert, and/or other message to the user) may be provided that the file already exists, in an operation 412. In response to a determination that the file does not exist (i.e., it is not a duplicate file), download of the file may be resumed, in an operation 404.

It will be appreciated that while FIG. 1 and the associated description depicts and describes a system 100 comprising a link hash server 110, a web server 120, client computing devices 130 and database 105, the invention in not limited to such a configuration. For example, the system 100 may include a plurality of link hash servers that communicate with a plurality of client computing devices 130. In some implementations, the system 100 may include a plurality of link hash servers (each including a data validator) that communicate with a plurality of databases 105. In yet other implementations, the system 100 may include a plurality of web servers that communicate with a plurality of client computing devices 130. Other configurations may be also be implemented. In some implementations, a plurality of client computing devices 130 may be owned by a single user. For example, a first client computing device may be the user's office computer, a second client computing device may be the user's home PC, a third client computing device may be the user's smartphone, and so forth. The user may create an online backup account where each of these computing devices are registered, such that hashes associated with files that are local to each of these computing devices is maintained in the backup account (in addition to the each of the computing devices separately maintaining the hashes of its own local files).

When the user requests a file download at the first client computing device, the file download is initiated and temporarily suspended, and a request for the hash is communicated to the link hash server 110. If the hash exists, link hash server may communicate the hash to the first client computing device. The hash is compared with hashes of files local to the first computing device. If there is no match (i.e., the file is not the first computing device), the hash is compared with the hashes maintained in the backup account (that includes the hashes associated with the other computing devices as well). If a match is found, the user may be notified that the file is does not exist at the first client computing device, but is available at another client computing device (i.e., either user's home PC, smartphone, or other device). In this manner, a check for the duplicate file may be performed across multiple user devices so as to allow the user to make an informed decision regarding whether he wants to cancel or continue the file download.

Figure 5:
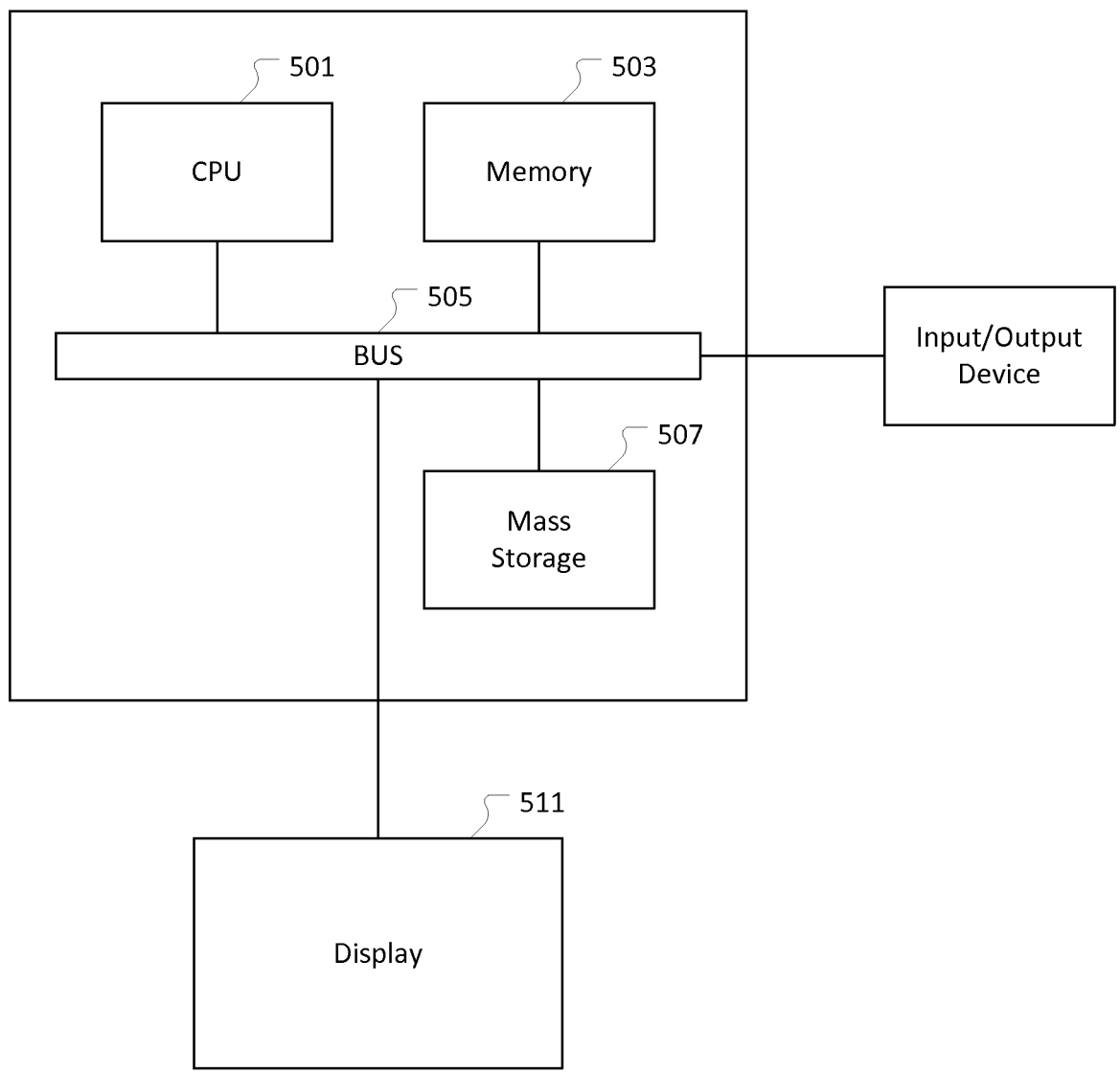
FIG. 5 is an illustration showing an exemplary computing device which can implement various embodiments of the invention.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality of the link hash server in accordance with some embodiments. The computing device of FIG. 5 may be used to perform embodiments of the functionality of the client computing device 130 in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIG. 3 (for the link hash server embodiments) and FIGS. 2, 4 (for the client computing device embodiments). The code embodying this functionality may be stored within memory 503 or mass storage device 507 for execution by a processor such as CPU 501 in some embodiments. The operating system on the computing device may be MS-WINDOWS™, UNIX™, LINUX™, iOS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system for providing a service to a plurality of client devices for identifying duplicate files before a file is downloaded prior to download in a client computing environment to improve performance of the computing environment, comprising:
   a link hash server coupled to a database, the link hash server configured to generate, over time, a database of hashes of files associated with URLs of web content across the Internet with the database configured to store hash information and uniform resource locator (URL) information for each of a plurality of files;
   the link hash server comprising a processor configured to:
      receive, from a browser of client computing device, an URL associated with a file whose download, from a first server to which the URL is directed, the first server distinct and operating independently from the link hash server, has been initiated and temporarily suspended at the client computing device;
      determine whether a hash of the file associated with the URL received from the browser exists in the database of the link hash server;
      in response to a determination that the hash of the file exists in the database, communicate an indication to the browser of the client computing device that the hash of the file exists along with the hash; and
      in response to a determination that the hash of the file does not exist in the database, communicating an indication to the browser of the client computing device that the hash of the file does not exist.

2. The system of claim 1, wherein the processor is further configured to:
   store in response to a determination that the hash of the file does not exist in the database, the URL;
   calculate, in response to a determination that the hash of the file does not exist in the database, the hash for the file in a monitoring component of the client computing device or in the first server; and
   store the hash associated with the file in the database.

3. The system of claim 1, wherein in response to a determination that the hash of the file exists in the database, the processor is further configured to communicate the hash to the client computing device.

4. The system of claim 1, wherein the processor configured to determine whether the hash exists in the database is further configured to query the database based on the URL, and wherein the hash information and URL information comprise a URL and a hash associated with each of the plurality of files.

5. The system of claim 1, wherein the processor is further configured to:
   update the hash information in the database at scheduled intervals based on a frequency at which URLs or files associated with the hash information are updated.

6. The system of claim 1, wherein a listing of hashes is generated with the assistance of a web crawler fetching files of URLs available over the Internet and hashing the fetched files.

7. The system of claim 1, wherein in response to a determination that the hash of the file for the URL received from the browser does not exist in the database, the link hash server is configured to subsequently access the download of the file associated with the received URL to the link hash server, calculate the hash of the file, and store a hash of the particular file for the URL to build up a repository of file information over time for subsequent use by the client or other clients.

8. A system for providing a service to a plurality of client devices for identifying duplicate files before a file is downloaded prior to download in a client computing environment to improve performance of the client computing environment, comprising:
   a browser configured to detect an initiation of a file download, temporarily suspend the initiation of the file download, and request a link hash server to provide a hash value for the file to aid the browser to make a decision whether or not to download the file;
   the link hash server configured to serve as a repository of hash information for files associated with web content, and in response to receiving a URL from the browser return 1) an indication of whether the link hash server has a hash for a file associated with the received URL and 2) including the hash value for the file for a positive indication that the link hash server has the hash for the file; and
   wherein the browser uses hash values received from the link hash server to determine if the file associated with the URL is stored on the client device.

9. A computer implemented method, comprising:
   detecting, by a browser of a client device, an initiation of a file download of a file associated with URL;

temporarily suspending the initiation of the file download;
requesting a link hash server to provide a hash value for the file to aid the browser to make a decision whether or not to download the file, wherein the link hash server serves for a plurality of clients as a repository of hash information for files associated with URLs of web content;
in response to receiving a hash of the file associated with the URL, the browser determining if the file associated with the URL is stored on the client device;
the browser making a determination to resume the file download if the associated file does not exist on the client device; and
the browser making a determination to terminate the file download if the associated file exists on the client device.

\* \* \* \* \*